US008359214B1

(12) United States Patent
Michalowski et al.

(10) Patent No.: US 8,359,214 B1
(45) Date of Patent: Jan. 22, 2013

(54) SYSTEM AND METHOD FOR PROCESSING DATA RELATED TO CHARGES APPLICABLE TO INVESTMENT ACCOUNTS

(75) Inventors: Philip W. Michalowski, Glastonbury, CT (US); Keith E. Golembiewski, Suffield, CT (US); Joseph M. Weiss, Glastonbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/609,781

(22) Filed: Sep. 11, 2012

Related U.S. Application Data (63) Continuation of application No. 12/250,132, filed on Oct. 13, 2008, now Pat. No. 8,265,962.

(51) Int. Cl.
*G06Q 40/00* (2006.01)
(52) U.S. Cl. .............................. 705/4; 705/35
(58) Field of Classification Search ................ 705/4, 35
See application file for complete search history.

(56) References Cited

U.S. PATENT DOCUMENTS

| | | | |
|---|---|---|---|
| 5,754,980 A | 5/1998 | Anderson et al. | |
| 5,878,405 A | 3/1999 | Grant et al. | |
| 5,893,071 A | 4/1999 | Cooperstein | |
| 5,913,198 A | 6/1999 | Banks | |
| 5,926,800 A | 7/1999 | Baronowski et al. | |
| 5,933,815 A | 8/1999 | Golden | |
| 6,049,772 A | 4/2000 | Payne et al. | |
| 6,064,986 A | 5/2000 | Edelman | |
| 6,275,807 B1 | 8/2001 | Schirripa | |
| 6,611,808 B1 * | 8/2003 | Preti et al. ........................ | 705/4 |
| 6,611,815 B1 * | 8/2003 | Lewis et al. ................. | 705/36 R |
| 6,636,834 B1 | 10/2003 | Schirripa | |
| 6,661,815 B1 | 12/2003 | Kozlovsky | |
| 6,868,358 B2 | 3/2005 | Brown, Jr. | |
| 6,950,805 B2 | 9/2005 | Kavanaugh | |
| 6,963,852 B2 | 11/2005 | Koresko, V | |
| 7,016,871 B1 * | 3/2006 | Fisher et al. .................... | 705/35 |
| 7,080,032 B2 | 7/2006 | Abbs et al. | |
| 7,089,201 B1 | 8/2006 | Dellinger et al. | |
| 7,113,913 B1 | 9/2006 | Davis et al. | |
| 7,124,088 B2 | 10/2006 | Bauer et al. | |
| 7,376,608 B1 | 5/2008 | Dellinger et al. | |
| 7,398,241 B2 | 7/2008 | Fay et al. | |
| 7,613,644 B1 | 11/2009 | Abbs et al. | |
| 7,624,058 B1 | 11/2009 | Abbs et al. | |

(Continued)

OTHER PUBLICATIONS

MetLife Introduces Simple, Lower-Cost Variable Annuity. Business Wire. Jul. 20, 2009.*

(Continued)

*Primary Examiner* — Kelly Campen
*Assistant Examiner* — John Preston
(74) *Attorney, Agent, or Firm* — Howard IP Law Group, PC (57) ABSTRACT

A system for data processing for an account of a financial product has a processor and a memory. The processor receives an account value and a charge applicable to the account based on a fraction of the value of the account; on a basis of a second period, shorter than a first period. Throughout the first period, the processor calculates a fractional charge based on the value of the account, and updates the account value by decrementing the account value in the amount of the fractional charge. At the end of the first period, the processor compares a charge for the first period based on the account value on one day during the first period to a sum of the fractional charges for the first period, and increases the account value by the difference if the first period charge is less than the sum of the fractional charges.

20 Claims, 6 Drawing Sheets

U.S. PATENT DOCUMENTS

| | | | |
|---|---|---|---|
| 7,711,624 | B2 | 5/2010 | Abbott et al. |
| 2001/0014873 | A1 | 8/2001 | Henderson et al. |
| 2001/0047325 | A1 | 11/2001 | Livingston |
| 2002/0035527 | A1 | 3/2002 | Corrin |
| 2002/0040307 | A1* | 4/2002 | Roscoe et al. ............ 705/4 |
| 2002/0174045 | A1 | 11/2002 | Arena et al. |
| 2002/0188540 | A1 | 12/2002 | Fay et al. |
| 2002/0194098 | A1 | 12/2002 | Stiff et al. |
| 2003/0088430 | A1 | 5/2003 | Ruark |
| 2003/0105652 | A1 | 6/2003 | Arena et al. |
| 2003/0120570 | A1* | 6/2003 | Dellinger et al. ............ 705/35 |
| 2003/0163402 | A1 | 8/2003 | Kincart |
| 2003/0171956 | A1 | 9/2003 | Cox et al. |
| 2003/0187764 | A1 | 10/2003 | Abbs et al. |
| 2004/0039601 | A1 | 2/2004 | Anderson |
| 2004/0039608 | A1 | 2/2004 | Mazur et al. |
| 2004/0088236 | A1 | 5/2004 | Manning |
| 2004/0172350 | A1 | 9/2004 | Atkinson et al. |
| 2004/0177022 | A1 | 9/2004 | Williams et al. |
| 2004/0181436 | A1 | 9/2004 | Lange |
| 2004/0204951 | A1 | 10/2004 | Wood et al. |
| 2004/0267647 | A1 | 12/2004 | Brisbois |
| 2005/0010453 | A1 | 1/2005 | Terlizzi et al. |
| 2005/0060251 | A1 | 3/2005 | Schwartz et al. |
| 2005/0080698 | A1 | 4/2005 | Perg et al. |
| 2005/0144103 | A1 | 6/2005 | Perg et al. |
| 2005/0144124 | A1 | 6/2005 | Stiff et al. |
| 2005/0177473 | A1 | 8/2005 | Angle |
| 2005/0234821 | A1 | 10/2005 | Benham et al. |
| 2005/0240521 | A1 | 10/2005 | Fuentes-Torres |
| 2006/0074787 | A1 | 4/2006 | Perg et al. |
| 2006/0080148 | A1 | 4/2006 | Koresko, V |
| 2006/0085338 | A1 | 4/2006 | Stiff et al. |
| 2006/0089892 | A1 | 4/2006 | Sullivan et al. |
| 2006/0095353 | A1 | 5/2006 | Midlam |
| 2006/0111997 | A1 | 5/2006 | Abbott et al. |
| 2006/0111998 | A1 | 5/2006 | Fisher et al. |
| 2006/0122871 | A1 | 6/2006 | Cowley et al. |
| 2006/0143055 | A1 | 6/2006 | Loy et al. |
| 2006/0149651 | A1 | 7/2006 | Robinson |
| 2006/0155622 | A1 | 7/2006 | Laux |
| 2006/0190373 | A1 | 8/2006 | Perg et al. |
| 2006/0195375 | A1 | 8/2006 | Bohn |
| 2006/0206398 | A1 | 9/2006 | Coughlin |
| 2006/0206401 | A1 | 9/2006 | Abbs et al. |
| 2006/0212379 | A1 | 9/2006 | Perg et al. |
| 2006/0212380 | A1 | 9/2006 | Williams et al. |
| 2006/0242052 | A1 | 10/2006 | Long et al. |
| 2007/0011063 | A1 | 1/2007 | Shelon et al. |
| 2007/0011069 | A1 | 1/2007 | Bevacqua, Jr. |
| 2007/0011086 | A1 | 1/2007 | Dellinger et al. |
| 2007/0021986 | A1 | 1/2007 | Cheung et al. |
| 2007/0033124 | A1 | 2/2007 | Herr et al. |
| 2007/0038488 | A1 | 2/2007 | Bauer et al. |
| 2007/0078690 | A1 | 4/2007 | Kohl |
| 2007/0100715 | A1 | 5/2007 | O'Donnell et al. |
| 2007/0100720 | A1 | 5/2007 | Bonvouloir |
| 2007/0100726 | A1 | 5/2007 | O'Flinn et al. |
| 2007/0100727 | A1 | 5/2007 | Multer et al. |
| 2007/0106589 | A1 | 5/2007 | Schirripa |
| 2007/0130035 | A1 | 6/2007 | Carden |
| 2007/0162380 | A1 | 7/2007 | Conroy |
| 2007/0198352 | A1 | 8/2007 | Kannegiesser |
| 2007/0198377 | A1 | 8/2007 | Livingston et al. |
| 2007/0239572 | A1 | 10/2007 | Harris et al. |
| 2007/0244777 | A1 | 10/2007 | Torre et al. |
| 2007/0271201 | A1 | 11/2007 | Armand et al. |
| 2007/0278288 | A1 | 12/2007 | Simmons |
| 2007/0288399 | A1 | 12/2007 | Reynolds |
| 2008/0010095 | A1 | 1/2008 | Joyce |
| 2008/0046382 | A1 | 2/2008 | Metz |
| 2008/0071661 | A1 | 3/2008 | Jeudy et al. |
| 2008/0189223 | A1 | 8/2008 | Baiye |
| 2008/0270194 | A1 | 10/2008 | West et al. |
| 2008/0306878 | A1 | 12/2008 | Elam, II et al. |

OTHER PUBLICATIONS

How you can lose money in a money fund: Fees. John Waggoner. Gannett news Service. Mar. 1, 2010.*

Sun Life Financial Offers Its First Fee-Based Variable Annuity. Business Wire. Feb. 24, 2011.*

The Right Rider: Boomers want guaranteed lifetime income, but don't want to buy an immediate annuity. Variable annuity issuers think they have a solution. Donald Jay Korn. Financial Planning. New York: Feb. 1, 2006. p. 104-106.

Panko, Ron. New Products. Best's Review, 108(3), 24. Jul. 2007, 1 page.

Antolin, Pablo. Longevity Risk and Private Pensions. Financial Market Trends,(92), 107,109-128. Jun. 2007.

Yates, Karen E & Liss, Stephen. Charitable Lead Annuity Trusts-A Primer. Taxation of Exempts, 19(1), 23. Jul. 2007, 6 pages.

Harshman, Scott & Schaller, Gordon. Private Annuities: An Income Tax Deferral Technique. Orange County Business Journal, 29(39), A56-A57. Sep. 2006.

Accelerated Death Benefits, http://www.medicare.gov/LongTermCare/Static/AceDeathBenefits.asp?dest=NAV%; no later than Jul. 23, 2007, 2 pages.

Alternatives to Long Term Care Insurance, http://www.senior-wealth-protection-advocates.com/long-term-care-insurancealternatives.html; no later than Jul. 23, 2007, 6 pages.

American Skandia Life Assurance Corpt/CT, publisher: Edgar Online, dated Dec. 31, 2007, 7 pages.

Anonymous, "Q2 2005 American Eqty Invt Life Hld Co Earnings Conference Call-Final", Aug. 4, 2005, Fair Disclosure Wire, 13 pages.

Anonymous, "Full disclosure variable life report. (Policy Analysis)", Nov. 13, 2006, National Underwriter Life & Health, v110, n43, p. 30, 3 pages.

Anonymous, "Risk Management: You've Come a Long Way, Baby", Aug. 1, 2005, Annuity Market News, 4 pages.

Blodget, H., Money for Nothing: The Real Trouble with Mutual Funds, Slate.com, Dec. 1, 2004, 2 pages.

Stout, R.G. et al.; "Dynamic Retirement Withdrawal Planning"; Financial Services Review 15 (2006) 117-131.

Facts about the New York Life Longevity Benefit Variable Annuity Product, New York Life Insurance Company, May 2007, 2 pages.

"Fidelity.com Glossary"; https://scs.fidelity.com/webxpress/help/topics/help_definition_p.shtml, no later than Jul. 23, 2007, 17 pages.

Form 485BPOS, (Apr. 26, 2006), Transamerica-NewLTC-LifetimeGMWB_May2006SECFiling.pdf, 230 pages.

Penn Mutual Variable Annuity Account III, SEC Form 497, Filed Oct. 2, 2006, 9 pages.

Form N-4, Transamerica Life Insurance Company; Separate Account VA Y; filed Apr. 26, 2006, 184 pages.

Glossary of Insurance Terms, http://www.iii.org/media/glossary/; no later than Jul. 23, 2007, 82 pages.

Income Select for Life; https://www.transamericaadvisor.com/contentServer/MediaServer? uri=/site/tciidex/media/PDF/Annuities_TCI/Client_Approved_Material/Tips_and_Techniques/. BRIS.pdf; May 2007, 20 pages.

"Jackson Enhances Living Benefit Options within its Perspective Family of Variable Annuities"; http://findarticles.com/p/articles/mi_m0EiN/is_2007_April_30/ai_n19041944, Apr. 30, 2007, 3 pages.

"Just the Facts: The Best of America All American Gold Annuity Key Facts"; Nationwide Financial Services, Inc.; https://ssc.nwseivicecenter.com/media/pdf/product/VAM-0504AO-FLpdf; Mar. 2006, 4 pages.

"Key to Making Retirement Savings Last: The Withdrawal Rate"; http://www.newyorklife.com/cda/0,3254,141.98,00.html; no later than Jul. 23, 2007, 2 pages.

Lifetime Legacy, http://www.americo.com/lifetime/lifetimelegacy.html, no later than Jul. 23, 2007, 2 pages.

"Making IRAs Last a Lifetime with Annuities"; http://www.fpamd.org/documents/MakingIRAsLastaLifetimewithAnnuities.pdf; Mar. 2006, 2 pages.

New York Life Longevity Benefit Variable Annuity Brochure, New York Life Insurance Company, May 2007, 8 pages.

New York Life Longevity Benefit Variable Annuity FactSheet, New York Life Insurance Company, May 2007, 2 pages.

New York Life Longevity Benefit Variable Annuity Prospectus Amendment dated Aug. 15, 2007, New York Life Insurance Company, Aug. 2007, 75 pages.

Pacific One Select Investor Guide; (Nov. 2007) http://www.mutualfunds.pacificlife.com/public/mutualfunds/product_info/individual_k/pdfs/d5026.pdf, 8 pages.

Gjertsen, L, "In Brief: Keyport Enhanced Variable Annuities," American Banker, vol. 165, Issue 157, p. 7, Aug. 16, 2000.

Prospectus, Penn Mutual Variable Annuity Account III, Enhanced Credit Variable Annuity; May 1, 2007, 54 pages.

"Prudential Investments Introduces Strategic Partners Annuity One; New Variable Annuity Offers Investors World-Class Money Managers and Flexible Product Features"; http://findarticles.com/p/articles/mi mOEIN/is_2000_Oct 9/ai_65846822, 3 pages.

Retireonyourterms; http://www.retireonyourterms.com/ glossary/GlossaryText.htm, no later than Jul. 23, 2007, 8 pages.

RiverSource Innovations Select Variable Annuity; http://www.riversource.com/rvsc/global/docs/INNOV-SELECT-NY-AAG.pdf, no later than Jul. 23, 2007, 4 pages.

"Scudder Investments Introduces Two New Variable Annuity Products with Travelers Life & Annuity", Jun. 9, 2003, PR newswire, pp. 1-4.

Shapiro et al. "Separating Annuity Buyers by Fixed Vs. Variable", April 5, 1993, National Underwriter Life/Health/Financial Services), V97, N14, PP20-21.

The Power and Protection of Income Annuities, (Empire Fidelity Investments Life Insurance Company), http //personal.fidelity.com/products/annuities/pdf/IncomeAnnuitySpecialReport.pdf, Mar. 2006, 2 pages.

Granza, Lee et al.; "Financing long -term care: Employee needs and attitudes, and the employer's role"; Benefits Quarterly, Brookfield: 4th qtr 1988. vol. 14, Iss. 4, 13 pgs.

Pizzani, Lori; "Annuity Helps with Long-Term Care", Annuity Market News, Sep. 1, 1999, 2 pgs.

Anonymous; Part IV: Insurance: Protecting What You've Got—Chapter 16: Insurance on You: Life, Disability and Health; Personal Finance for Dummies (5th ed.); Hoboken: 2006, 23 pgs.

John Hancock Life Insurance Company: John Hancock launches next generation variable annuity guaranteed minimum withdrawal rider, press release, John Hancock, May 13, 2005, pp. 1-3.

New York Life Insurance Company: New York Life lets lifetime income annuity customers capitalize on potential interest rate increases, Press Release, New York Life, Jul. 24, 2006, pp. 1-2.

The Federal Register, Apr. 30, 2007, vol. 72, Issue 082, p. 21103, 21 pages.

MetLife Introduces Simple, Lower-Cost Variable Annuity, Business Wire, 4 pages, Jul. 20, 2009.

Waggoner, John; How you can lose money in a money fund; Gannett News Service, 3 pages, Mar. 1, 2010.

SunLife Financial Offers Its First Fee-Based Variable Annuity, Business Wire, 4 pages, Feb. 24, 2011.

S&P U.S. Indices Index Methodology, Standard & Poor's, Sep. 2007, 22 pages.

Paradis, T., More Funds Adopt Performance-Based Fees, Washingtonpost.com (Associated Press), Apr. 8, 2007, 2 pages.

* cited by examiner

| Month | Yr 1, Mth 1 | Yr 1, Mth 2 | Yr 1, Mth 3 | Yr 1, Mth 4 | Yr 1, Mth 5 | Yr 1, Mth 6 | Yr 1, Mth 7 | Yr 1, Mth 8 | Yr 1, Mth 9 | Yr 1, Mth 10 | Yr 1, Mth 11 | Yr 1, Mth 12 |
|---|---|---|---|---|---|---|---|---|---|---|---|---|
| Starting AV | $100,000 | $100,833 | $101,674 | $102,521 | $103,375 | $104,237 | $105,105 | $105,981 | $106,864 | $107,755 | $108,653 | $109,558 |
| Monthly Fees Paid | $167 | $168 | $169 | $171 | $172 | $174 | $175 | $177 | $178 | $180 | $181 | $183 |
| Annual Fees Paid | | | | | | | | | | | | $2,094 |
| Refund | | | | | | | | | | | | $94 |
| Total Annuity Fees | $167 | $167 | $167 | $167 | $167 | $167 | $167 | $167 | $167 | $167 | $167 | $167 |
| Total Annual Fees Cap | | | | | | | | | | | | $2,000 |
| End AV | | | | | | | | | | | | $109,653 |

Fig. 6B

| | Yr 2, Mth 1 | Yr 2, Mth 2 | Yr 2, Mth 3 | Yr 2, Mth 4 | Yr 2, Mth 5 | Yr 2, Mth 6 | Yr 2, Mth 7 | Yr 2, Mth 8 | Yr 2, Mth 9 | Yr 2, Mth 10 | Yr 2, Mth 11 | Yr 2, Mth 12 |
|---|---|---|---|---|---|---|---|---|---|---|---|---|
| | $109,653 | $110,566 | $111,488 | $112,417 | $113,354 | $114,298 | $115,251 | $116,211 | $117,180 | $118,156 | $119,141 | $120,134 |
| | $183 | $184 | $186 | $187 | $189 | $190 | $192 | $194 | $195 | $197 | $199 | $200 |
| | | | | | | | | | | | | $2,296 |
| | | | | | | | | | | | | $103 |
| | $183 | $183 | $183 | $183 | $183 | $183 | $183 | $183 | $183 | $183 | $183 | $183 |
| | | | | | | | | | | | | $2,193 |
| | | | | | | | | | | | | $120,237 |

Fig. 6C

| | Yr 3, Mth 1 | Yr 3, Mth 2 | Yr 3, Mth 3 | Yr 3, Mth 4 | Yr 3, Mth 5 | Yr 3, Mth 6 | Yr 3, Mth 7 | Yr 3, Mth 8 | Yr 3, Mth 9 | Yr 3, Mth 10 | Yr 3, Mth 11 | Yr 3, Mth 12 |
|---|---|---|---|---|---|---|---|---|---|---|---|---|
| | $120,237 | $121,239 | $122,249 | $123,268 | $124,295 | $125,331 | $126,375 | $127,429 | $128,490 | $129,561 | $130,641 | $131,730 |
| | $200 | $202 | $204 | $205 | $207 | $209 | $211 | $212 | $214 | $216 | $218 | $220 |
| | | | | | | | | | | | | $2,518 |
| | | | | | | | | | | | | $113 |
| | $200 | $200 | $200 | $200 | $200 | $200 | $200 | $200 | $200 | $200 | $200 | $200 |
| | | | | | | | | | | | | $2,405 |
| | | | | | | | | | | | | $131,843 |

…

SYSTEM AND METHOD FOR PROCESSING DATA RELATED TO CHARGES APPLICABLE TO INVESTMENT ACCOUNTS

CROSS REFERENCE TO RELATED APPLICATIONS

This application is a continuation of co-pending U.S. patent application Ser. No. 12/250,132 entitled SYSTEM AND METHOD FOR ADMINISTRATION OF COSTS RELATED TO ANNUITIES, filed Oct. 13, 2008, the entire contents of which are incorporated herein by reference for all purposes.

FIELD OF INVENTION

The present invention relates to computer systems, and particularly to computer systems for calculating features of financial products.

BACKGROUND

An annuity is a type of insurance service. In general terms, in an annuity contract, an insurance company and an annuitant contract for the annuitant to make one or more payments to the insurance company. For that consideration, the insurance company makes periodic payments to an annuitant. By way of example, the insurance company may be obliged to make a payment of a predetermined amount to the annuitant annually for a predetermined time period. In another example, the insurance company is obliged to make payments of a predetermined amount to the annuitant annually for the life of the annuitant. Annuities may also be provided that are intended to reflect gains available with securities markets. Such annuities are generally referred to as variable annuities. The asset value of a variable annuity may be dependent on changes in value of a mutual fund, a stock index, or another investment vehicle.

The costs charged by the insurance company in association with an annuity contract must be disclosed by regulation. In a variable annuity, the charges include at least a mortality and expense charge, an administration charge, and a fund expense. A mortality and expense charge arises from the insurance risks assumed by the insurance company, as well as commissions, selling and certain administrative expenses. An administration charge is generally applied to variable annuity accounts, to cover administrative expenses of the insurance company on an ongoing basis. Fund expenses generally represent fees of a money manager who is engaged by the insurance company. Fund expenses may include a management fee, a distribution or 12b-1 fee, and other expenses.

In addition, an annuitant may select one or more optional riders to be associated with the variable annuity. An example of a rider is a rider to provide a guaranteed minimum withdrawal benefit (GMWB); a GMWB rider provides protection against declines in asset value of the variable annuity. The costs of riders are often paid for out of annual fees based on the asset value of the variable annuity.

SUMMARY OF THE INVENTION

In one embodiment, a system for administration of a variable annuity account has a processor and a memory in communication with the processor. The processor is adapted to receive data including a net asset value of the account at a commencement of an annual period; receive data including an amount of a management fee applicable to the account and based on a fraction of the net asset value of the account; on a daily basis throughout the annual period: calculate a fractional daily charge based on the net asset value of the account on each day during the period, the amount of the management fee and the number of days in the annual period; on a daily basis, update the net asset value by decrementing the net asset value in the amount of the daily charge; store the daily updated net asset value in memory; and store each of the daily charges in memory; at the end of the annual period: calculate an annual charge based on the net asset value of the account on one day during the annual period and the value of the management fee; calculate a sum of the daily charges for the annual period; calculate a difference between the annual charge and the sum of the daily charges; if the annual charge is less than the sum of the daily charges, calculate an annually updated net asset value equal to the sum of the daily updated net asset value for the day of calculation and the difference between the annual charge and the sum of the daily charges, and provide an output signal having data indicative of the annually updated net asset value and the difference between the annual charge and the sum of the daily charges.

In an embodiment, a system for administration of an insurance annuity account has a processor and a memory in communication with the processor; The processor is adapted to: receive data including a net asset value of the account at a commencement of a first period; receive data including a charge applicable to the account and based on a fraction of the net asset value of the account; on a basis of a second period, shorter than the first period, throughout the first period: calculate a fractional charge based on the net asset value of the account on the basis of the second period, the value of the charge and the number of second periods in the first period; update the net asset value on the basis of the second period by decrementing the net asset value in the amount of the fractional charge; store the updated net asset value in memory; and store each of the fractional charges in memory; at the end of the first period: calculate a charge for the first period based on the net asset value of the account on one day during the first period and the value of the charge; calculate a sum of the fractional charges for the first period; calculate a difference between the first period charge and the sum of the fractional charges; if the first period charge is less than the sum of the fractional charges, calculate an updated net asset value equal to the sum of the updated net asset value for the day of calculation and the difference between the first period charge and the sum of the fractional charges; and provide an output signal having data indicative of the net asset value and, if the net asset value was increased by the difference between the first period charge and the sum of the fraction charges, indicative of the difference between the first period charge and the sum of the fractional charges.

In an embodiment, a computer-implemented method for administration of a variable annuity account includes receiving by a processor data including a net asset value of the account at a commencement of a first period; receiving by a processor data including a charge applicable to the account and based on a fraction of the net asset value of the account; on a basis of a second period, shorter than the first period, throughout the first period: calculating by the processor of a fractional charge based on the net asset value of the account on the basis of the second period, the value of the charge and the number of second periods in the first period; storing the fractional charge in memory; updating the net asset value decrementing the net asset value in the amount of the fractional charge; storing the updated net asset value in memory; and store each of the fractional charges in memory; at the end of the first period: calculating a first period charge for the first period based on the net asset value of the account on one day during the first period and the rate of the charge; calculating a sum of the fractional charges for the first period; calculating a difference between the first period charge and the sum of the fractional charges for the first period; if the first period charge is less than the sum of the fractional charges, calculating an updated net asset value equal to the sum of the updated net asset value for the day of calculation and the difference between the first period charge and the sum of the fractional charges; and providing an output signal having data indicative of the net asset value and, if the net asset value was increased by the difference between the first period charge and the sum of the fraction charges, indicative of the difference between the first period charge and the sum of the fractional charges.

In an embodiment, a computer-readable medium has instructions thereon which, when executed by a processor, cause the processor to perform the steps of: receiving data including a net asset value of the account at a commencement of a first period; receiving data including a charge applicable to the account and based on a fraction of the net asset value of the account; on a basis of a second period, shorter than the first period, throughout the first period: calculating a fractional charge based on the net asset value of the account on the basis of the second period, the value of the charge and the number of second periods in the first period; updating the net asset value by decrementing the net asset value in the amount of the fractional charge; storing the updated net asset value in memory; and storing each of the fractional charges in memory; at the end of the first period: calculating a first period charge for the first period based on the net asset value of the account on one day during the first period and the rate of the charge; calculating a sum of the fractional charges for the first period; calculating a difference between the first period charge and the sum of the fractional charges for the first period; if the first period charge is less than the sum of the fractional charges, calculating an updated net asset value equal to the sum of the updated net asset value for the day of calculation and the difference between the first period charge and the sum of the fractional charges; and providing an output signal having data indicative of the net asset value and, if the net asset value was increased by the difference between the first period charge and the sum of the fraction charges, indicative of the difference between the first period charge and the sum of the fractional charges.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems, and methods for administration of insurance products such as annuities. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Figure 1:
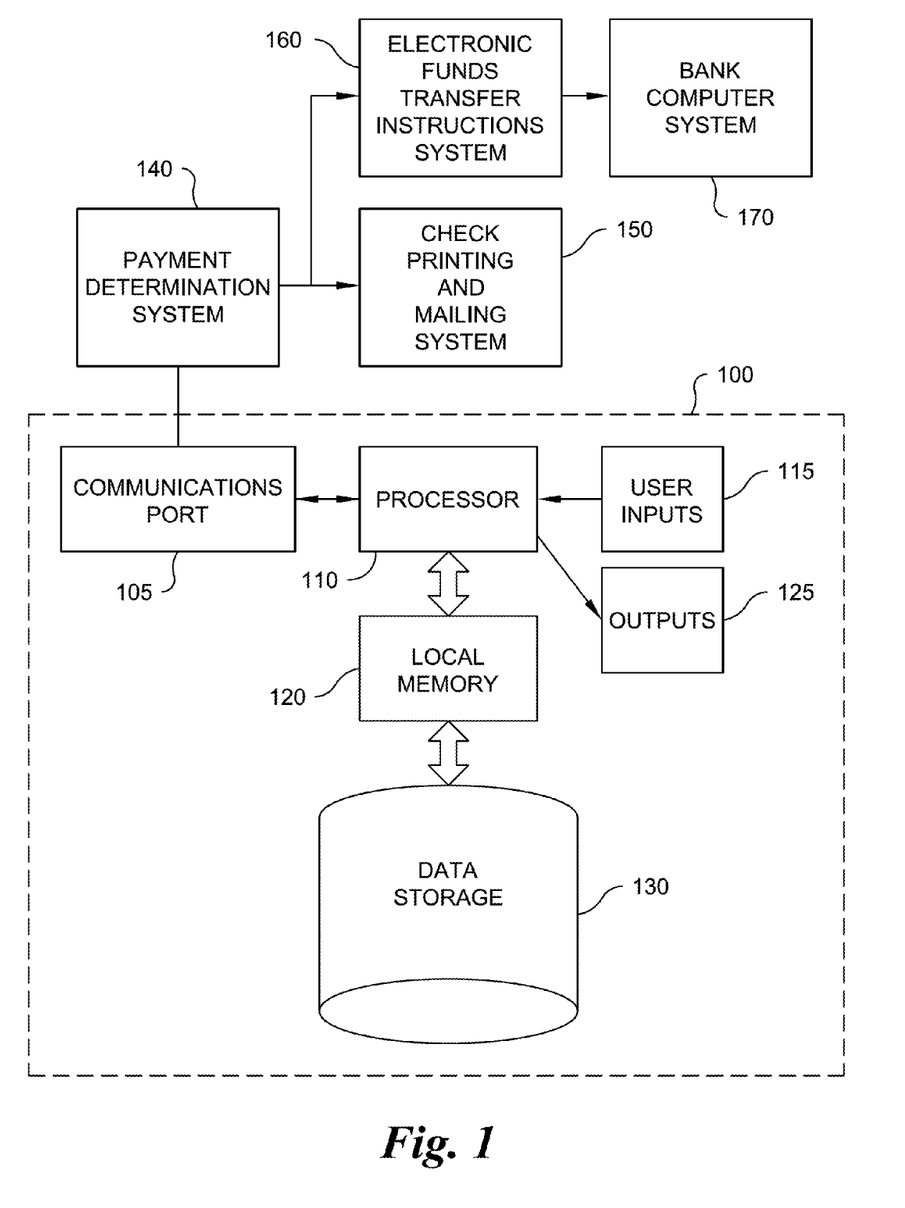
FIG. 1 is a schematic diagram of an exemplary computer system for implementation of a method and system of the invention.

Referring to FIG. 1, an exemplary computer system for use in the implementation of the invention will now be described. In computer system 100, processor 110 executes instructions contained in programs stored on recorded media. Processor 110 communicates, such as through suitable buses and other data channels, with communications port 105 and local memory 120, receives data from user inputs 115, and provides data to outputs 125. Local memory 120 is configured to exchange data with processor 110, and may store programs containing processor-executable instructions, and values of variables for use by such programs. Data storage 130 may include a wide variety of data acquired and processed in accordance with the invention. User input may be provided at user inputs 115, which may include keyboards, mice and touchscreens. Outputs 125 may include displays and printers. Communications port 105 communicates with remote sources of information. Communication may be by one or more of suitable communication methods, including over wired or wireless local area networks and wide area networks, and over communications between networks, including over the Internet. Any suitable data and communication protocols may be employed.

Figure 2:
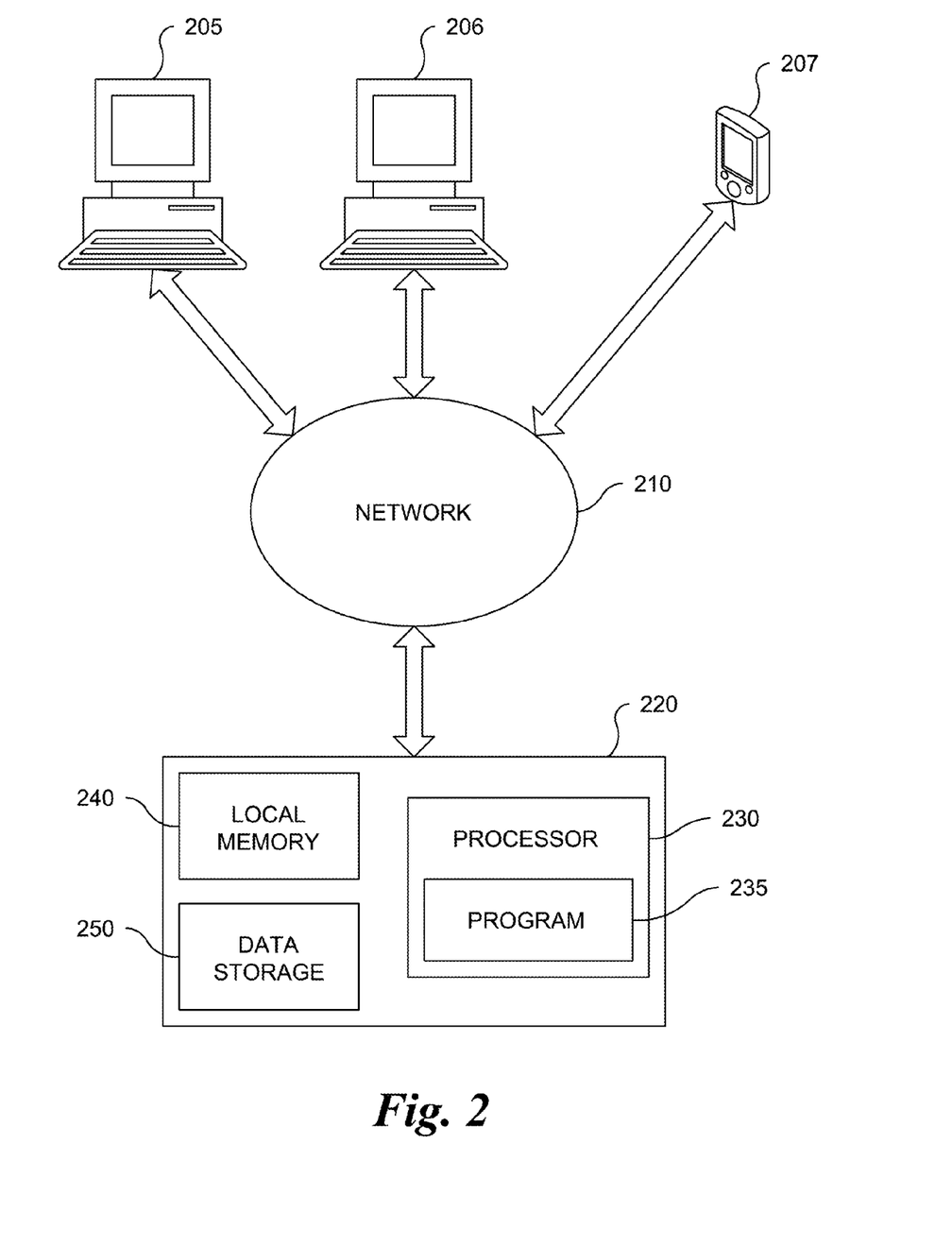
FIG. 2 is a schematic diagram of an exemplary network system for implementation of a method and system of the invention.

Referring now to FIG. 2, a schematic diagram of a client server arrangement for implementation of a method and system in accordance with an embodiment of the invention is presented. In the arrangement of FIG. 2, client devices 205, 206, 207 may be connected via network 210 to server 220. In an implementation, client devices 205, 206, 207 may be personal computers running an operating system such as Windows XP, Windows Vista, or Apple Tiger, thin client devices, portable devices such as personal digital assistants (running the Palm OS, by way of example), cell phones, or other devices. Client devices may be operated variously by individual prospective annuitants, insurance brokers or other financial advisors, or by personnel of an insurance service provider. Network 210 may be or include the Internet, a corporate intranet, wireless and wired communications channels, and other network features. Server 220 may include processor 230 having local memory 240 and data storage 250. Program 260 runs on processor 230. Program 260 may initiate sessions with one more of client devices 205, 206, 207. Program 260 may prompt the user for information regarding investment amounts and other issues. Program 260 may also provide a web front end, and be linked to back end computer systems for implementing administration of annuities. Program 260 may be, by way of example only, a Java-based program.

Figure 3:
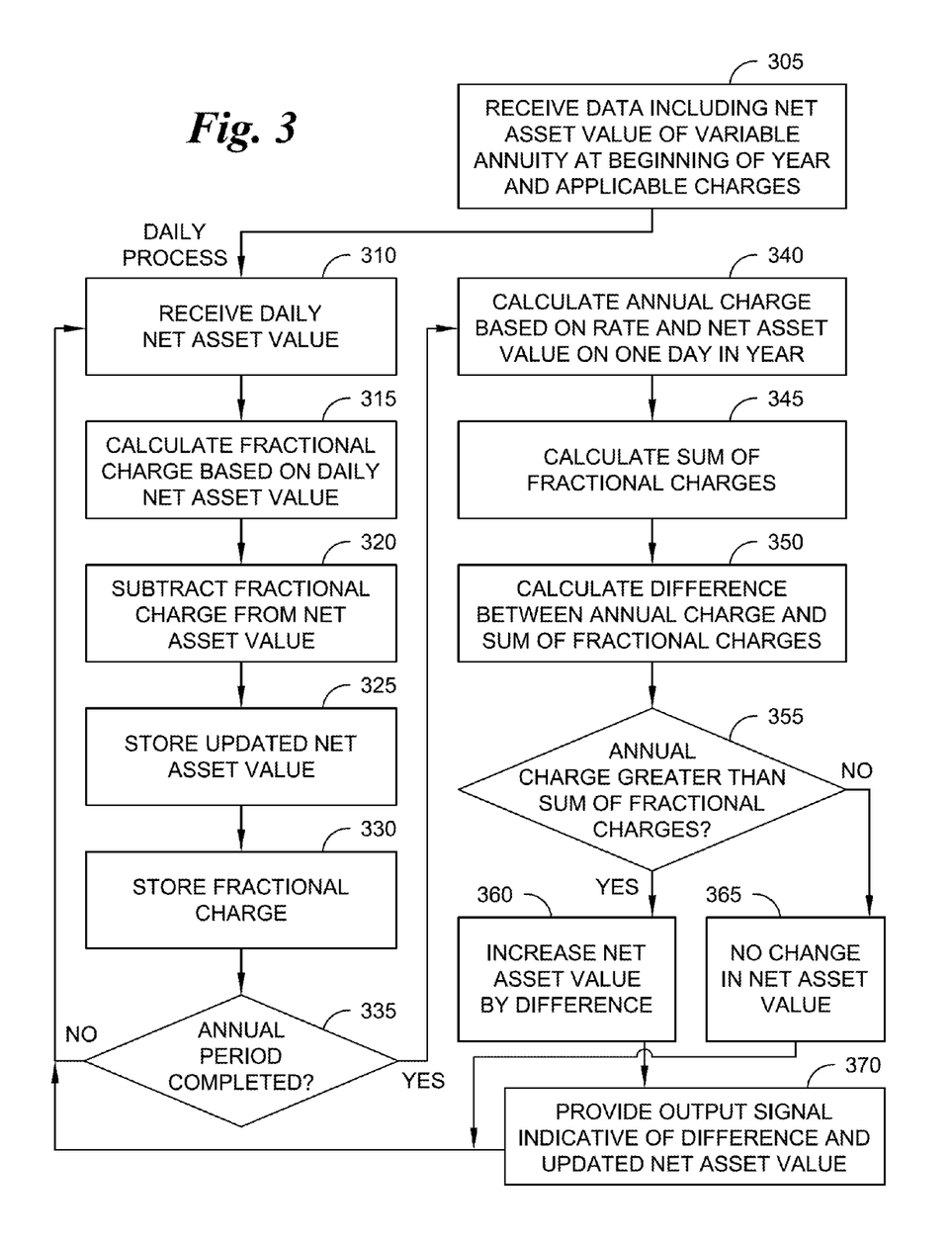
FIG. 3 is a process flow diagram illustrating a method for administering annuities implemented by the computer system of FIG. 1.

Referring now to FIG. 3, a high level process flow of a method for administering an annuity product will be explained, with reference to the computer system of FIG. 1. In accordance with an implementation, a user, who may be a prospective annuitant, an individual who is considering funding an annuity for another, an insurance broker, or another financial advisor, is evaluating whether the annuitant or other individual may or should enter into an insurance contract with an insurance company for funding of a variable annuity. A program running on a processor may cause the processor to execute a simulation program. The simulation program may have pages that are served by a web server to client devices, in one implementation. In another implementation, the simulation program may run on a local computer. In that implementation, the net asset value may be selected by the user; the charges are generated by the simulation program. In another implementation, a variable annuity account is being administered.

In the method, a processor executes a series of steps in accordance with instructions stored on a computer-readable medium, such as a hard drive, optical drive, or other memory device. A processor receives data 305 including a net asset value of the account at a commencement of a first period and a charge applicable to the account and based on a fraction of the net asset value of the account. In an implementation, the first period may be a year in duration, such as from one anniversary of the account to the next anniversary of the account. The first period may be of different duration, such as a month, quarter or other duration. The charge may be in the nature of a fee, such as a fund fee for a variable annuity, a mortality and expense fee, a rider fee, an administration charge, or other fee or charge. The charge is calculated on a percentage of the net asset value of the account.

On a basis of a second period, shorter than the first period, throughout the first period, the processor calculates a fractional charge based on the net asset value of the account on the basis of the second period, the value of the charge and the number of second periods in the first period. For example, the first period may be a year; the second period may be a day; there may be 360 days in the year for purposes of insurance accounting; the charge may be 2% of the net asset value of the account each year. The calculation is carried out during each second period, such as once daily. The processor receives the daily net asset value 310. The daily net asset value is derived from changes in the price of underlying fund shares, daily fractional charges, withdrawals and premium payments, as is understood by those of skill in the art of the administration of annuities. Based on the daily net asset value, the rate of the charge and the fraction, the processor calculates 315 the fractional charge for that day. The processor updates 320 the net asset value on the basis of the second period by decrementing the net asset value in the amount of the fractional charge, and stores 325 the updated net asset value in memory. The processor stores 330 the calculated fractional charge in memory.

The processor then determines 335 if the first period, which may be an annual period, has been completed. The processor may compare a current date to a date of commencement of the contract, for example. If the first period has not been completed, then the process flow returns to the second period process flow for the next second period, such as for the next day. If the first period has been completed, then the process flow moves to tasks carried out once each first period, e.g., once each year or each month. The processor calculates 340 a charge for the first period based on the net asset value of the account on one day during the first period and the rate of the charge. The day may be a predetermined day, such as the first day in the period, or the day in the middle of the period. The day may be selected based on net asset value; for example, if there are no withdrawals or additional premium payments, the day on which the net asset value has the lowest value during the first period may be selected. The processor may calculate 345 calculate a sum of the fractional charges for the first period. The processor may calculate 350 a difference between the first period charge and the sum of the fractional charges. As indicated by blocks 355 and 360, if the first period charge is less than the sum of the fractional charges, the processor calculates an updated net asset value equal to the sum of the updated net asset value for the day of calculation and the difference between the first period charge and the sum of the fractional charges. As indicated by blocks 355 and 365, if the first period charge is equal to or greater than the sum of the fractional charges, the processor does not change the net asset value. The processor stores the updated net asset value, if the net asset value is updated. The processor provides 370 an output signal having data indicative of the updated net asset value and the difference between the first period charge and the sum of the fractional charges. The process flow then returns to the daily process flow to commence calculations associated with charges for the next year.

The updated net asset value and the difference between the first period charge and the sum of the fractional charges may be made available for review in a variety of manners. By way of example, in the system depicted in FIG. 1, the updated net asset value and the difference between the charges may be formatted for display or printing and provided to output 125, which may include a display or a printer. The updated net asset value and the difference between the charges may be stored in a memory location and available to processor 230 of FIG. 2; in this context, in response to a user request from client device 205, 206 or 207 for an illustration or a statement, processor 230 may access the relevant data, and provide a document that is served to client device 205, 206 or 207 for display. Program 235 may include instructions to cause processor 230 to request the net asset value data and charge data for the account from another system, such as from a back end processing system, and to format the received data in a predetermined display format to be served to client devices 205, 206, 207. In an embodiment, xml tags may be provided for conveying of calculated difference between the charges.

In an embodiment where an illustration is being provided, program 235 may include instructions that cause processor 230 to format and serve a prompt on one of client devices 205, 206, 207 for the user to provide a net asset value for use in the illustration. The user may be, for example, a prospective annuitant, a broker or another financial advisor, who is evaluating and comparing different annuity products. The net asset value received from the user input may be employed in the process flow illustrated and described with respect to FIG. 3, for example.

In an embodiment, a program may include instructions for printing of a variable annuity document, the document bearing an actual or illustrative difference between the sum of fractional charges and a charge for a first period, such as a year. The instructions may provide for inclusion of the difference data in various documents relating to variable annuities. For example, the document may be a statement, a prospectus or an illustration.

In an implementation, one or more payments in amounts based on the net asset value as determined by the processor using the difference between the sum of the fractional charges and the annual charge may be disbursed to an annuitant or a beneficiary. For example, the entire available net asset value may be disbursed on the death of the annuitant. In another example, an annuitant may elect to start receiving an annuity, in which the amount payable periodically may be a percentage of the net asset value. In an example, a guaranteed minimum withdrawal benefit rider may be applicable to the annuity account, and a certain percentage, such as 5 percent, of the net asset value may be available for withdrawal. In the system of FIG. 1, an instruction for a withdrawal may be provided via a user input. The processor 110 may access the net asset value, updated in accordance with the process flow of FIG. 3 and based in part on the difference between the sum of the fractional charges and an annual charge, from data storage 130, determine an amount payable amount payable, and provide an output signal indicating the amount payable. Communications port 105 may communicate with payment determination system 140. Payment determination system 140 may include one or more computer systems, including processors, memory devices, user inputs, outputs, software executed by the processors, and other conventional components. Payment determination system 140 may be adapted to receive an output signal via communications port 105, which output signal includes payment information, such as an amount, a date payable, and information identifying an annuitant. Payment determination system 140 may further be adapted to determine a payor account and a payment method. The payor account may be an account with a selected bank; by way of example, payment determination system 140 may include a look-up table mapping annuitant information, such as geographic information, to a particular bank and account. Payment determination system 140 may also include stored in memory and accessible by a processor information indicating whether a particular annuitant is to be paid by paper check, by electronic funds transfer, or in some other manner. A processor of payment determination system 140 may cause to be stored in memory of the payment determination system the determined payor account information and the determined payment method. The processor of payment determination system 140 may cause a digital signal to be output indicative of the stored payor account information, the stored payment method, amount information and payee information. The output digital signal is provided to a fulfillment system, such as check printing and mailing system 150, or electronic funds transfer instructions system 160.

In an embodiment, the output digital signal may be received by check printing and mailing system 150. Check printing and mailing system 150 may include one or more computer systems, including processors, memory devices, user inputs, outputs, software executed by the processors, and other conventional components. The outputs include in particular one or more printers, and may include other devices useful in printing and mailing paper checks, such as devices for feeding paper, separating printed checks, inserting printed checks into envelopes, sealing envelopes, and applying postage to envelopes as appropriate. The printed check is then mailed to the annuitant. The annuitant deposits the check in the annuitant's bank account, causing funds to be credited to the annuitant's bank account, and causing the funds to be withdrawn from the designated bank account from which the payment is made.

In an embodiment, the output digital signal from payment determination system 140 may be received by electronic funds transfer instructions system 160. Electronic funds transfer instructions system 160 may include one or more computer systems, including processors, memory devices, user inputs, outputs, software executed by the processors, and other conventional components. Electronic funds transfer instructions system 160 includes a processor adapted to provide an output signal indicative of an instruction to a bank determined by the payor account information to provide an electronic funds transfer from the payor account to a payee account in an amount as previously determined, such as by processor 110.

The output signal from electronic funds transfer instructions system 160 may be provided to a bank computer system 170, which carries out an electronic funds transfer, debiting the designated account, and resulting in a credit to a designated annuitant account.

Figure 4:
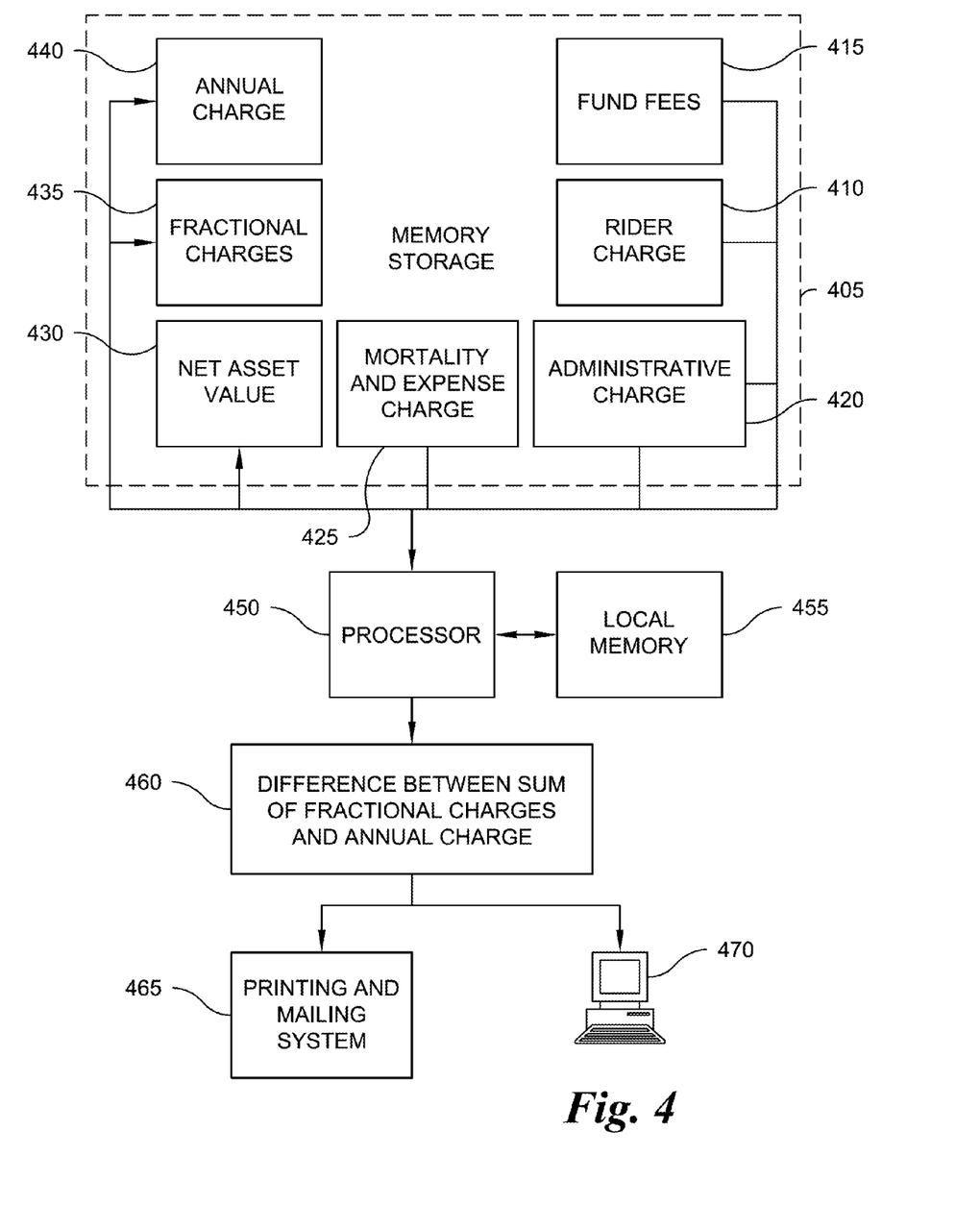
FIG. 4 is a schematic diagram illustrating a method and system for administering annuities.

Referring now to FIG. 4, a schematically illustrated embodiment of the invention will be discussed. In the embodiment, memory storage device 405 stores data indicative of rider charges 410, fund fees 415, administrative charges 420, mortality and expense charges 425 and net asset value 428. Each of these charges may variously be a percentage charged periodically, such as 1% of the asset value charged per year or 1/365% of the asset value charged per day, a dollar amount charged periodically, such as $1000 per year, or $3.00 per day, or another formula. Fund fees 415 may depend on the fund selected, and the asset value of the portion of the account managed by the fund. Processor 450 communicates with memory storage device 405 and accesses data indicative of rider charges 410, data indicative of fund fees 415, data indicative of administrative charges 420, data indicative of mortality and expense charges 425, and data indicative of net asset value 430. In an embodiment, the fund fee may be an average fund fee, which is charged by an insurance company regardless of the fund associated with a fund selected by an insured, advisor or other customer. Processor 450 may store accessed data and calculated figures temporarily in local memory 455. Processor 450 may determine a daily fractional charge 435 based on one or more of these charges. Processor 450 may calculate updated net asset values, fractional charges and annual charges, and store the updated net asset value data 430, fractional charge data 435 and annual charge data 440 in memory storage device 405. Processor 450 calculates the difference between the sum of the fractional charges and the annual charge 460, and outputs this data to printing and mailing system 465, for printing of account statements and other documents, and to computer system 470, which may be a broker, other financial advisor, annuitant or other computer system, or may be a web server, by way of example.

Figure 5:
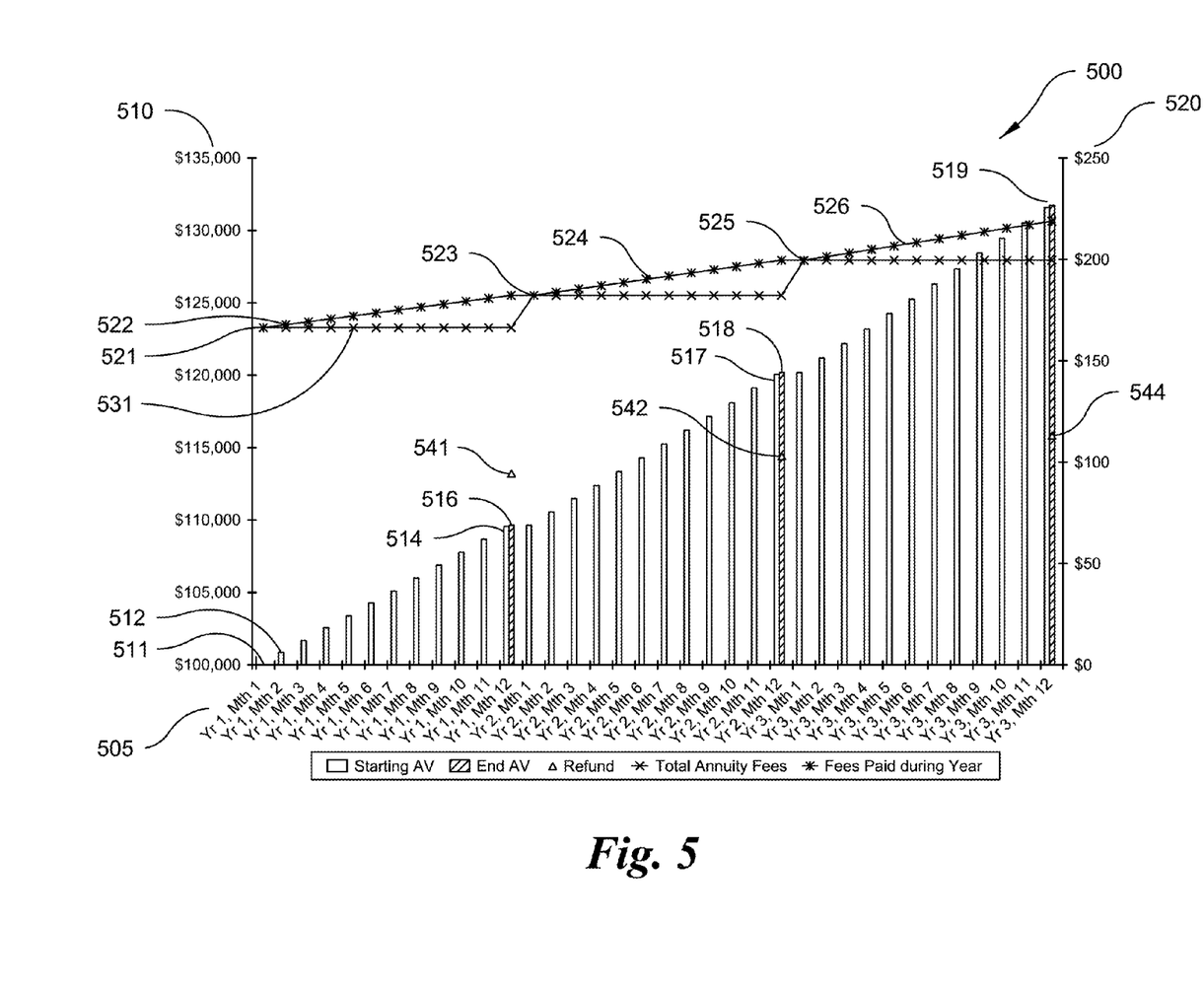
FIG. 5 is a graph showing an exemplary implementation of a method and system for administering annuities.
Figure 6A:
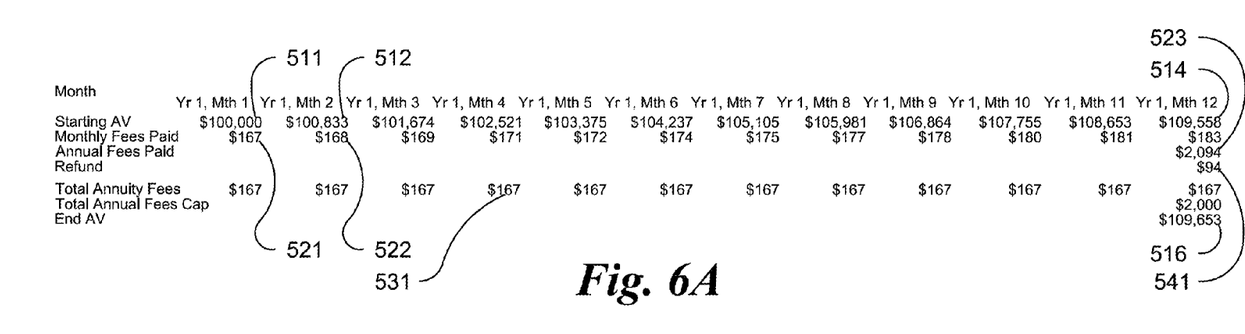
FIGS. 6A to 6C are tables illustrating the implementation of FIG. 5.
Figure 6B:
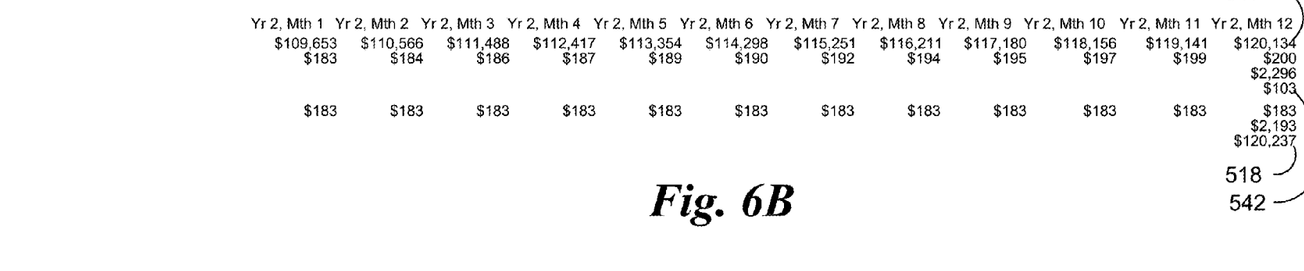
Figure 6C:
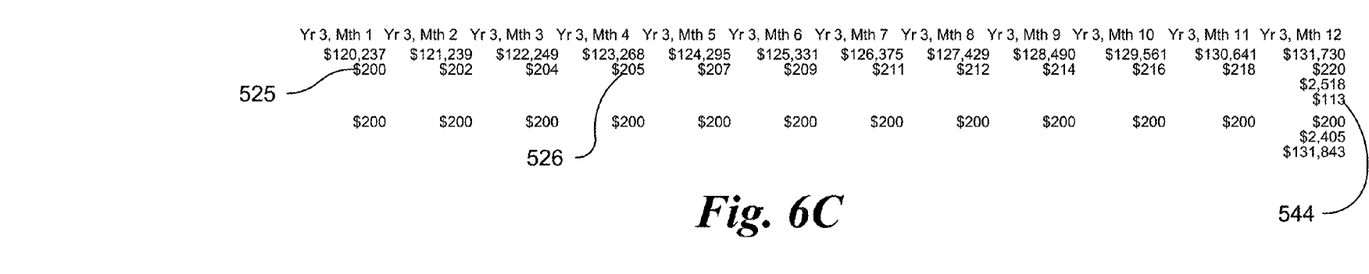

FIG. 5 is a graph showing an illustration of an implementation of a method and system for administration of an annuity. FIGS. 6A-6C present the same information in the form of a table. In graph 500, the x-axis represents time in monthly intervals over a three year period. The y-axis represents net asset value, shown at 510, as well as fees, shown at 515. In this example, the initial net asset value of the annuity, at 511, is $100,000. The return is 12% per year, or 1% per month. The fees are 2% per year. In the first month of the first year, for example, the net asset value has a return of 1% of the initial net asset value, or $1000, and fees of 1/12 of 2% based on the initial net asset value, or $167, at 521. After increasing the net asset value by the return, and reducing by the fee, the net asset value after one month, at 512, is $100,833. In the next month, both the return and the fee are based on the increased net asset value 512, and thus the fee is $168, at 522, and the return is greater as well. The fee shown as if the base for calculation of the fee were the initial net asset value 511 throughout the first year is shown at 531. At the end of the first year, the net asset value has reached $109,558, at 514. The total fees, calculated on the basis of the shorter second period, which is a month in this example, are $2094, which is shown at 523 (only in FIG. 6A). The sum of $2094 represents the sum of the fractional fees. The fees calculated at the annual rate of 2% on the basis of the initial net asset value of $100,000, are $2000. The difference between the sum of the fractional fees and the annual fees is $94, shown at 541. That amount is added to the net asset value, resulting in an increase from the end of year net asset value at 514 to the net asset value for the beginning of the second year at 516.

In the second year, the fees are initially calculated on the basis of the net asset value at the beginning of the year, as shown at 523. The fees are calculated on a monthly basis on the basis of the net asset value at the beginning of the month, as shown generally at 524, which is greater than 1/12 of the annual fee if calculated on the net asset value at the beginning of the year. At the end of the second year, the difference is calculated, and the difference 542 is added to the net asset value, increasing from 517 to 518.

In the third year, similarly, the fees are initially calculated at 525 on the basis of the initial net asset value 518, but then increase as shown generally at 526. As the sum of the fractional charges shown generally at 526 is higher than the fee based on the net asset value at the beginning of the third year, a difference of $113, shown at 544, is calculated and added to the net asset value. In an embodiment, the increase in the net asset value as a result of incrementing the net asset value by the difference may be termed a refund.

In an embodiment, if the first period charge (such as an annual charge) is less than the sum of the fractional charges, a system processor may calculate a return on the difference between the first period charge and the sum of the fractional charges, and increase the net asset value based on the calculated amount of the return. The return may be calculated by applying a percentage increase in the net asset value over the first period to the difference between the first period charge and the sum of the fractional charges. In an example, the percentage increase in the net asset value over the first period may be same as the percentage increase in the difference amount. In another example, the percentage increase in the difference amount may be a percentage, such as 50%, of the percentage increase in the net asset value over the first period. For example, if the net asset value increase over a one year period is 6%, and the difference is $100, then the net asset value is increased by $103 at the end of the first period. In another example, the net asset value calculations over the first period may be recalculated, using fractional fee charges reduced in a total amount over the first period by the difference amount; in this example, each fractional charge may be reduced by a fraction of the difference equal to the second period length divided by the first period length.

The present invention is operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by processor 110 executing instructions contained in programs which may be stored in a storage medium, such as local memory 120 or data storage 130. It will be appreciated that any of the steps in the methods in accordance with the invention described herein may be so implemented.

Exemplary advantages associated with implementation of a method and system in accordance with the invention include reduction in the length of disclosures of variable annuities as a result of simplification of the fee calculations and providing greater ease to customers and brokers in understanding of fees applicable to variable annuities.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for processing data for an account of a financial product, comprising:
   a memory device, in communication with the processor, the memory device storing data relating to the financial product, the stored data including account value data and periodic charge data in the nature of charges related to compensation of advisors and based on a rate to be applied to the account value for a term equal to a duration of a first period;
   a processor in communication with the memory device and configured to:
   access account value data and charge data from the memory device;
   on a basis of a second period, shorter than the first period, throughout the first period:
   calculate an amount of fractional charge based on the rate, the account value and a ratio based on a number of second periods in the first period;
   update the account value by decrementing the account value in the amount of the fractional charge;
   store the updated account value in the memory device; and
   store each of the amounts of the fractional charges in the memory device;
   at the end of the first period:
   calculate a reference charge for the first period based on the rate applied to the account value at one day during the first period;
   calculate a sum of the fractional charges for the first period;
   compare the reference charge for the first period and the sum of the fractional charges for the first period;
   responsive to determining that the reference charge for the first period is less than the sum of the fractional charges, calculate an updated account value equal to the sum of the updated account value for the day of calculation and a difference between the reference charge for the first period and the sum of the fractional charges; and
   provide output data indicative of the account value and, if the account value was increased by the difference between the reference charge for the first period and the sum of the fractional charges, provide output data indicative of the difference between the reference charge for the first period and the sum of the fractional charges; and
   a printing and mailing system configured to receive output data from the processor and print account statements reflecting the received data.

2. The computer system of claim 1, wherein the charge comprises fund management fees.

3. The computer system of claim 1, wherein the charge is an average fund management expense.

4. The computer system of claim 3, wherein the fund management expense is predetermined and independent of a customer investment selection.

5. The computer system of claim 1, wherein the processor is further configured to provide instructions for printing of a document bearing the difference between the reference charge for the first period and the sum of the fractional charges.

6. The computer system of claim 1, wherein the processor is further configured to, responsive to determining that the reference charge for the first period is less than the sum of the fractional charges, calculate a return on the difference between the first period charge and the sum of the fractional charges, and determine an increase in the account value based on the calculated return on the difference.

7. The computer system of claim 6, wherein the processor is further configured to calculate the return by applying a percentage increase in the account value over the first period to the difference between the reference charge for the first period and the sum of the fractional charges.

8. The computer system of claim 1, wherein the processor is further configured to, responsive to determining that the reference charge for the first period is less than the sum of the fractional charges, recalculate the account value over the first period, using fractional fee charges, each reduced in an amount equal to: (a) the difference between the reference charge for the first period and the sum of the fractional charges, multiplied by (b) the second period duration divided by the first period duration.

9. The computer system of claim 1, wherein the processor is further configured to, in response to an instruction for a withdrawal from the account, determine an amount payable, and provide an output signal, and the system further comprises:
   a payment determination system having a processor for: receiving the output signal, determining of a payor account and a payment method; storing of the determined payor account information and the determined payment method in a memory of the payment determination system; outputting of a digital signal indicative of the stored payor account information, the stored payment method, amount information and payee information; and
   a payment fulfillment system for receiving the digital signal from the payment determination system and for fulfillment of payment in accordance with the information conveyed by the digital signal from the processor of the payment determination system.

10. A computer-implemented method for processing data relating to an account of a financial product, comprising:
   storing in a data storage device data relating to the account including an account value and periodic charge data in the nature of charges related to compensation of advisors and based on a rate to be applied to the account value for a term equal to a duration of a first period
   accessing by a processor data stored in the data storage device, including account value data and rate data;
   on a basis of a second period, shorter than the first period, throughout the first period:
      calculating by the processor of fractional charge data based on the value of the account, the rate of the charge and a ratio based on a number of second periods in the first period;
      updating by the processor the account value by decreasing the account value in the amount of the fractional charge;
      storing data indicative of the updated account values in the data storage device; and
      storing the fractional charge data in the data storage device;
   at the end of the first period:
      calculating by the processor a reference first period charge for the first period based on the account value on one day during the first period and the rate of the charge;
      calculating by the processor a sum of the fractional charges for the first period;
      comparing by the processor the reference first period charge and the sum of the fractional charges for the first period;
      responsive to determining that the reference first period charge is less than the sum of the fractional charges, calculating by the processor an updated account value equal to the sum of the updated account for the day of calculation and the difference between the reference first period charge and the sum of the fractional charges; and
      providing by the processor output data indicative of the account value and, if the net asset value was increased by the difference between the reference first period charge and the sum of the fractional charges, data indicative of the difference between the first period charge and the sum of the fractional charges.

11. The computer-implemented method of claim 10, wherein the first period is a year, and the second period is a day.

12. The computer-implemented method of claim 10, wherein the charge comprises fund management fees.

13. The computer-implemented method of claim 10, wherein the charge comprises rider fees.

14. The computer-implemented method of claim 10, wherein the charge is an average fund management expense.

15. The computer-implemented method of claim 14, wherein the fund management expense is predetermined and independent of a customer fund selection.

16. The computer-implemented method of claim 10, further comprising providing by the processor of instructions for printing of a document bearing the difference between the reference first period charge and the sum of the fractional charges, receiving the instructions by a printing and mailing system, and printing an account statement bearing the difference between the reference first period charge and the sum of the fractional charges.

17. A non-transitory computer-readable storage medium having a plurality of instructions thereon which instructions, when executed by a processor, cause the processor to:
   access from a memory device stored data relating to an account of a financial product, the stored data including account value data and periodic charge data in the nature of charges related to compensation of advisors and based on a rate to be applied to the account value for a term equal to a duration of a first period;
   on a basis of a second period, shorter than the first period, throughout the first period:
      calculate an amount of fractional charge based on the rate, the account value and a ratio based on a number of second periods in the first period;
      update the account value by decrementing the account value in the amount of the fractional charge;

store the updated account value in the memory device; and store each of the amounts of the fractional charges in the memory device;

at the end of the first period:

calculate a reference charge for the first period based on the rate applied to the account value at one day during the first period;

calculate a sum of the fractional charges for the first period;

compare the reference charge for the first period and the sum of the fractional charges for the first period;

responsive to determining that the reference charge for the first period is less than the sum of the fractional charges, calculate an updated account value equal to the sum of the updated account value for the day of calculation and a difference between the reference charge for the first period and the sum of the fractional charges; and provide output data indicative of the account value and, if the account value was increased by the difference between the reference charge for the first period and the sum of the fractional charges, output data indicative of the difference between the reference charge for the first period and the sum of the fractional charges.

18. The non-transitory computer-readable storage medium of claim 17, wherein the instructions further cause the processor to, responsive to determining that the reference charge for the first period is less than the sum of the fractional charges, calculate a return on the difference between the first period charge and the sum of the fractional charges, and determine an increase in the account value based on the calculated return on the difference.

19. The non-transitory computer-readable storage system of claim 18, wherein the instructions further cause the processor to calculate the return by applying a percentage increase in the account value over the first period to the difference between the reference charge for the first period and the sum of the fractional charges.

20. The non-transitory computer-readable storage system of claim 19, wherein the instructions further cause the processor to calculate the return by applying a percentage less than 100% of the percentage increase in the account value over the first period to the difference between the reference charge for the first period and the sum of the fractional charges.

* * * * *